(12) United States Patent
Backhouse

(10) Patent No.: US 11,022,081 B2
(45) Date of Patent: Jun. 1, 2021

(54) METHOD FOR ACHIEVING FINAL AIR GAP AND PARALLELISM OF A FUEL INJECTOR CONTROL VALVE

(71) Applicant: DELPHI TECHNOLOGIES IP LIMITED, St. Michael (BB)

(72) Inventor: Simon Backhouse, Gloucester (GB)

(73) Assignee: DELPHI TECHNOLOGIES IP LIMITED

( * ) Notice: Subject to any disclaimer, the term of this patent is extended or adjusted under 35 U.S.C. 154(b) by 0 days.

(21) Appl. No.: 16/482,496

(22) PCT Filed: Jan. 29, 2018

(86) PCT No.: PCT/EP2018/052175
§ 371 (c)(1),
(2) Date: Jul. 31, 2019

(87) PCT Pub. No.: WO2018/141696
PCT Pub. Date: Aug. 9, 2018

(65) Prior Publication Data
US 2020/0011278 A1 Jan. 9, 2020

(30) Foreign Application Priority Data
Jan. 31, 2017 (GB) .................................. 1701555

(51) Int. Cl.
*F02M 47/00* (2006.01)
*F02M 47/02* (2006.01)
*B23K 26/36* (2014.01)
(Continued)

(52) U.S. Cl.
CPC ........... *F02M 47/022* (2013.01); *B23K 26/36* (2013.01); *F02M 61/168* (2013.01);
(Continued)

(58) Field of Classification Search
CPC ............. F02M 47/022; F02M 63/0035; F02M 63/0021; F02M 61/168; F02M 2200/8069; F02M 47/027
See application file for complete search history.

(56) References Cited

U.S. PATENT DOCUMENTS 4,978,074 A * 12/1990 Weinand ............... F02M 51/066
239/585.3
5,947,442 A * 9/1999 Shurman ............ F02M 63/0017
251/129.16
(Continued)

FOREIGN PATENT DOCUMENTS

DE 10202324 A1 7/2003
DE 102008040015 A1 12/2009

*Primary Examiner* — Phutthiwat Wongwian
*Assistant Examiner* — Sherman D Manley
(74) *Attorney, Agent, or Firm* — Joshua M. Haines

(57) ABSTRACT

A method is provided for achieving final air gap and parallelism of a control valve of a fuel injector, the control valve having a body defining an transverse top face and including a thick disc magnetic armature having a planar transverse upper face. The method includes a) measuring the actual position from the armature upper face and the body top face and, determining the actual parallelism error between said faces; and b) ablating the armature to generate an ablated upper face parallel to the body top face, the distance from the ablated upper face to the body top face being a final air gap.

9 Claims, 2 Drawing Sheets

(51) Int. Cl.
  *F02M 61/16* (2006.01)
  *F02M 63/00* (2006.01)
(52) U.S. Cl.
  CPC .... *F02M 63/0021* (2013.01); *F02M 63/0035* (2013.01); *F02M 2200/8069* (2013.01)

(56) References Cited

U.S. PATENT DOCUMENTS

| | | | | |
|---|---|---|---|---|
| 6,550,699 | B2 * | 4/2003 | Nagai | F02M 47/027 239/585.1 |
| 9,523,333 | B2 * | 12/2016 | Bolz | F02M 51/0664 |
| 2004/0021012 | A1 * | 2/2004 | Lewentz | F02M 61/10 239/533.11 |
| 2007/0138324 | A1 * | 6/2007 | Ibrahim | F02M 63/0024 239/585.4 |
| 2007/0215827 | A1 * | 9/2007 | Kaneko | F02M 63/0015 251/129.16 |
| 2008/0169366 | A1 * | 7/2008 | Lewis | F02M 63/0015 239/584 |
| 2010/0005646 | A1 * | 1/2010 | Manubolu | H01F 7/1623 29/596 |
| 2010/0006679 | A1 * | 1/2010 | Manubolu | F02M 63/0015 239/585.5 |
| 2010/0007224 | A1 * | 1/2010 | Manubolu | F02M 47/027 310/14 |
| 2010/0175670 | A1 * | 7/2010 | Coldren | F02M 63/0035 123/473 |
| 2011/0006999 | A1 * | 1/2011 | Chang | G06F 3/0443 345/173 |
| 2011/0147493 | A1 * | 6/2011 | Mitsuoka | B23K 26/36 239/533.2 |
| 2013/0248612 | A1 * | 9/2013 | Ayanji | F02M 51/0685 239/5 |
| 2015/0041568 | A1 * | 2/2015 | Izzo | F02M 63/0075 239/585.5 |
| 2017/0328319 | A1 | 11/2017 | Legrand | |

* cited by examiner

METHOD FOR ACHIEVING FINAL AIR GAP AND PARALLELISM OF A FUEL INJECTOR CONTROL VALVE

CROSS REFERENCE TO RELATED APPLICATIONS

This application is a national stage application under 35 USC 371 of PCT Application No. PCT/EP2018/052175 having an international filing date of Jan. 29, 2018, which is designated in the United States and which claimed the benefit of GB Patent Application No. 1701555.3 filed on Jan. 31, 2017, the entire disclosures of each are hereby incorporated by reference in their entirety.

TECHNICAL FIELD

The present invention relates to a control valve of a fuel injector and to a method for ensuring, in said valve, parallelism of an upper face of a magnetic armature and of a valve body top face thus achieving an air gap thickness between said faces.

BACKGROUND OF THE INVENTION

In a fuel injector, a needle valve member reciprocally moves along a main axis to alternatively enable or prevent fuel injection. The pressure in a control chamber associated to said needle is varied by alternating a control valve having a body extending about a main axis from an axially transverse top face to an opposed bottom face and being provided with an axial hydraulic bore opening in a recess defining a chamber opening in said top face. The control valve further comprises a spool comprising a thick disc magnetic armature having opposed upper and lower faces and, a stem press-fitted in an axial central drilling of the armature. In a rest position, the spool is arranged in the body the stem being axially guided in the hydraulic bore and, the armature lying in the recess, the upper face of the armature being slightly recessed from the top face of the body by a Final Air Gap (FAG). The FAG is calculated from the average distance of the armature upper face below the sealing top face of the body and, the parallelism is defined between said faces.

The FAG is achieved by inserting the stem in the armature while the armature upper face is onto a raised portion of a stepped plate, the step being equal to the FAG value plus a known compensation for stem material compression. The parallelism is a consequence of the accuracy of the stepped plate and the perpendicularity of the guide, pin and armature features.

In a latest improvement of the process the fixed step is replaced with a piezo-actuation of the armature position and this method has been used with previous product iterations where the tolerances have been significantly higher, but due to focus on performance variation, this method is no longer suitable.

Once assembled there are no features that can be used to fixture from to resist the resultant forces applied by traditional precision methods such as grinding, micro-finishing, lapping or turning. There is also a problem with generating debris prior to injector build.

SUMMARY OF THE INVENTION

Accordingly, it is an object of the present invention to resolve the above mentioned problems in providing a method for achieving final air gap (FAG), and parallelism of a control valve, of a fuel injector said control valve having a body extending about a main axis from an axially transverse top face to an opposed lower face and, being provided with an axial hydraulic bore opening in a recess defining a chamber and opening in said top face. The control valve is further provided with spool comprising a thick disc magnetic armature having an axial central drilling opening at each ends in a planar transverse upper face and an opposed lower face and, a stem press-fitted in said central drilling, Said spool is arranged in the body in a rest position wherein the stem is axially guided in the hydraulic bore and the armature lies in the chamber the upper face of the armature being slightly recessed from the top face of the body.

The method comprises the following steps:
measuring the actual position from the armature upper face and the body top face and, determining the actual parallelism error between said faces,
ablating the armature to generate an ablated upper face parallel to the body top face, the distance from the ablated upper face to the body top face being a final air gap.

In a further aspect of the invention, measuring may comprise the following steps:
determining the tilt axis, and the line of greatest slope of said armature upper face said tilt axis and line being perpendicular to each other, the tilt axis being the transverse axis about which said upper face is angled.
calculating a tilt height between the ends of the line of greatest slope, said tilt height being the distance measured along the main axis from the highest point of the line to the lowest point of the line, the highest point being closer to the body top face and the lowest point being further recessed in the chamber.
dividing said tilt height in individual ablating pass depth.

More precisely, the ablating step comprises:
ablating the armature via successive pass of said individual depth and, generating the ablated face, in successively ablating a plurality of parallel bands extending along the tilt axis.

Also, in the dividing step the tilt height is of constant depth.

More particularly, the constant depth may be about 1 μm.

Also, during the ablating step the band comprising the highest point of the line of greatest slope, the highest point band, is ablated several time and the band comprising to the lowest point of the line of greatest slope, the lowest point band, is ablated only one time.

In other words, the highest point band is ablated as many time as the tilt height has been divided in step.

Also, the ablating step is performed in using a picosecond or a femtosecond pulsed laser.

The invention further extends to a control valve of a fuel injector, said control valve having a body extending about a main axis from an transverse top face to an opposed lower face and being provided with an axial hydraulic bore opening in a recess defining a chamber and opening in said top face.

The control valve is further provided with a spool comprising a thick disc magnetic armature having an axial central drilling opening at each ends in a planar transverse upper face and an opposed lower face and, a stem press-fitted in said central drilling, the spool being arranged in the body in a rest position wherein, the stem, is axially guided in the hydraulic bore, and the armature is lying in the chamber, the armature upper face being slightly recessed from the body top face.

Furthermore, the armature upper face is ablated as per the method previously described.

Also, the final air gap tolerance of said control valve is about 2 µm and the parallelism of the armature upper face and the body top face is about 10 µm.

The invention further extends to a fuel injector comprising a control valve as previously described.

BRIEF DESCRIPTION OF THE DRAWINGS

The present invention is now described by way of example with reference to the accompanying drawings in which.

DESCRIPTION OF THE PREFERRED EMBODIMENTS

To inject fuel in a cylinder of an internal combustion engine, a fuel injector is provided with a control valve 12 enabling pressure to vary in a control chamber such that, a needle valve moves and open or close spray holes arranged in a nozzle of the injector. The example is chosen from a diesel fuel injector.

Figure 1:
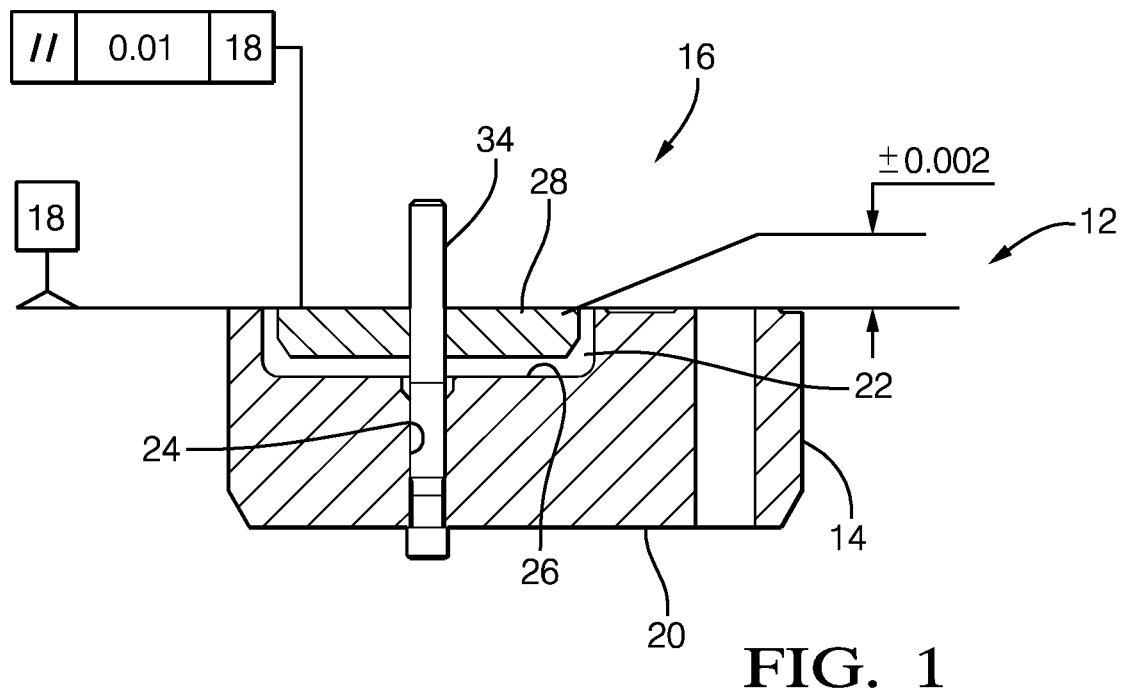
FIG. 1 is an axial section of a control valve.

More in detail in reference to the axial section of FIG. 1, the control valve 12 has a body 14 in which is arranged a moving spool 16. The body 14 is a cylindrical member extending along a main axis X between a top transverse face 18 and an opposed lower face 20. In the body 14 are arranged a recess 22 forming a chamber 22 opening in the top face 18 and, an hydraulic bore 24 extending along a main axis X and opening at a lower end in the lower face 20 and, at an upper end in the bottom 26 of the recess 22.

The spool 16 comprises the fixed assembly of a thick cylindrical disc-like magnetic armature 28 having an upper face 30 and an opposed lower face with, a stem 34 inserted and crimped in a central drilling provided in said armature 28. In place, the stem 34 is slidably guided in the hydraulic bore 24 and the armature 28 lies in the chamber 22. Other known means of fixation, such as welding or screwing, can alternatively be utilised to replace the crimping.

In the assembled injector, the control valve 12 is pressed between an actuation member and the nozzle assembly, the valve body top face 18 being in sealing surface contact against a lower face of said actuation member. As visible on FIG. 2, the body top face 18 is provided with sealing areas adapted to be in said sealing contact with said actuation member, and with larger area in recess to said sealing areas. The sealing areas are for instance an annular ring face surrounding the opening of the chamber 22 and three angular sectors arranged on the peripheral edge of said top face. Hereafter, said sealing areas are identified as the body top face 18. Also the magnetic armature 28 is entirely in the chamber 22, the armature upper face 30 being parallel and slightly recessed relative to said top face 18 (sealing areas) by a final air gap (FAG). Positioning tolerances are extremely tight and, as shown on the figure, a parallelism of 10 µm and a recess of 2 µm between the armature upper face 30 and the body top face 18 are realistic example.

When the parts are first made and arranged together said tolerances are exceeded and not met and, to achieve such dimensions the upper face 30 of the armature is finished in following a method 100 of ablation by parallel bands using an ultra-short pulse laser such as a picosecond or a femtosecond pulsed laser.

Figure 2:
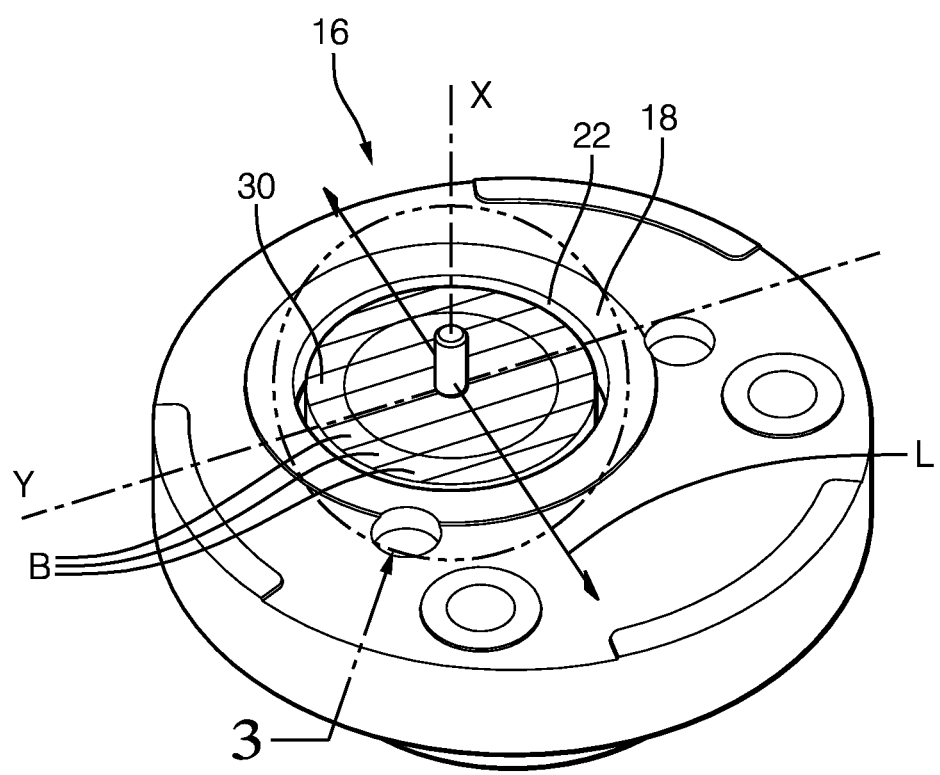
FIG. 2 is a 3D view of the control valve of FIG. 1.
Figure 3:
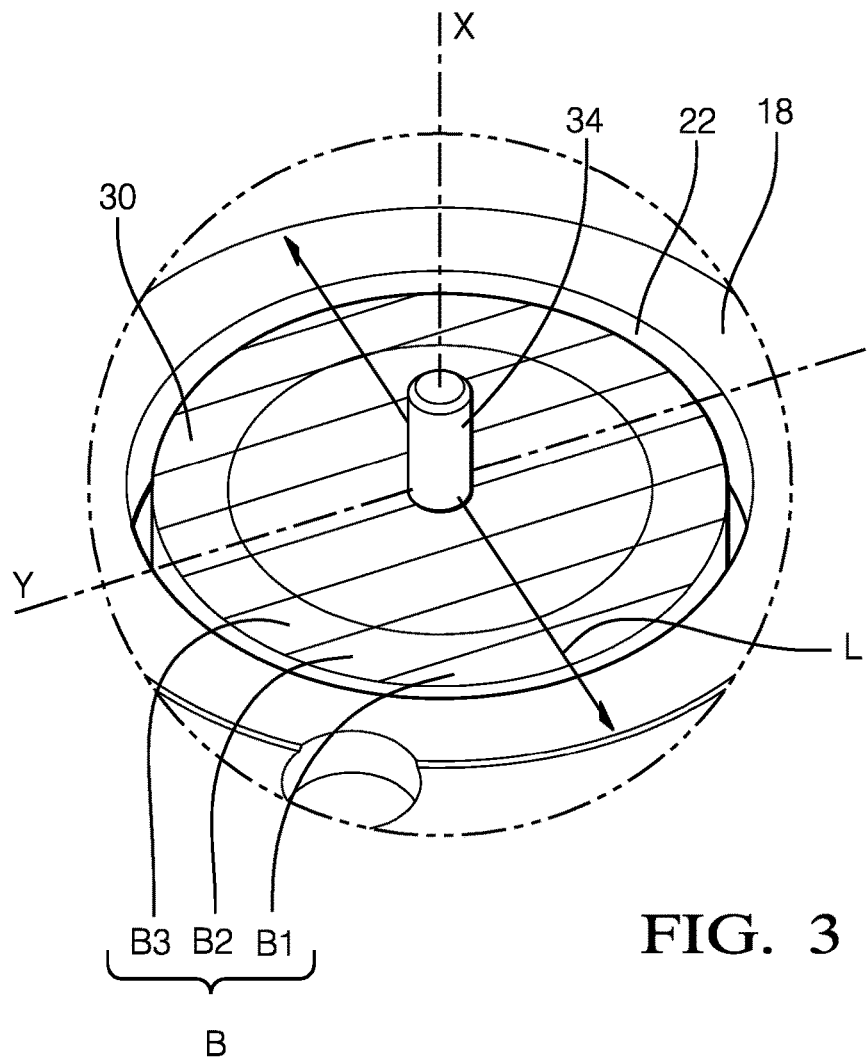
FIG. 3 is a magnified portion of FIG. 2.
Figure 4:
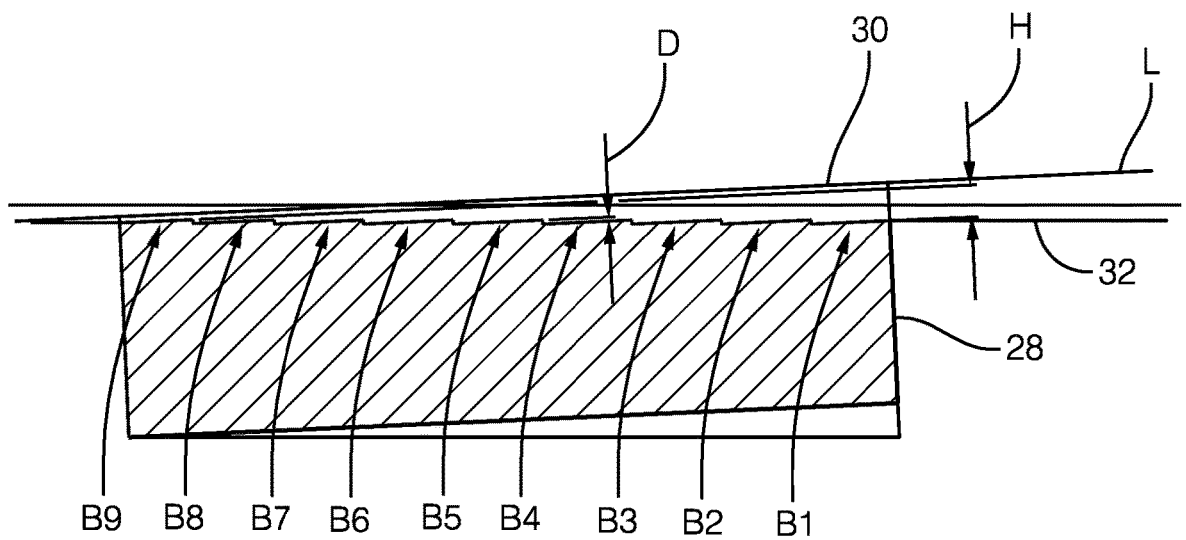
FIG. 4 is an axial section of a magnetic armature of the control valve of FIG. 2.

In reference to the FIGS. 2 to 4, the method 100 initial step is to measure 110 the relative position from the armature upper face 30 and the body top face 18 and, to determine the actual parallelism error between said faces. A measuring device can be either of contact type using an arrangement of positional probes across the body top face 18 to set the datum and the armature upper face 30 to construct a plane. Another option is to use a non-contact type such as optical interferometry to achieve the same result. The FAG tolerance achievement is expected to be as much as ±3 µm and the parallelism 15 µm.

In said measuring step 110, the body top face 18 is the reference face and, both faces 18, 30 being planar at start, said parallelism error is an angular tilt of the armature upper face 30 relative to the body top face 18.

A following step is to determine 112 the tilt axis Y about which the armature upper face 30 is angled and also, the line of greatest slope L of the armature upper face 30. Said axis Y and line L are perpendicular to each other, the tilt axis Y being a transverse axis also perpendicular to the main axis X.

A subsequent step is to calculate 114 a tilt height H between the opposed ends of the line of greatest slope L. In other words, the tilt height H is the axial X distance from the highest point of the line L to the lowest point of the line L, said points being at the intersection of the line L and the peripheral edge of the upper face 30. The highest point is closer to the body top face 18 and the lowest point is further recessed in the chamber 22.

Then, said tilt height H is divided 116 in a plurality of individual ablating pass depth D. A preferred dividing step is to have constant depth D of about 1 µm while other values may be chosen. Said division also determines a number of parallel bands B on the upper face 30, said bands B being perpendicular to the line of greatest slope L. Said method steps 110-116 prepare the operational step coming next.

Said operational step consist in ablating 120 the armature upper face 30, said ablating step 120 being performed by successive passes, each of the depth D previously calculated in step 114. Said successive passes are performed band after bands B of the upper face 30. The ablating step 120 is started by a first band B1 comprising the highest point of the line of greatest slope L where a depth D of surface material is removed from this first band B1. The following step is to ablate a second band B2, neighbour to the first band B1, as well as ablating the first band B1. After this second pass, a depth D of surface material has been removed once from the second band B2 and twice form the first band B1. This continues as long as the last band B comprising the lowest point of the line L is not ablated. Therefore, if the upper face 30 comprises N bands B, the first band B1 is ablated N times for a total depth of N.D and the last band "BN" is ablated just one time for a depth of 1.D.

More precisely, the ablating operation is performed by having the entire area of a band scanned by the beam of said ultra-short pulse laser which focuses on the surface of the band. Tests have been performed programing the laser to scan each band by moving along the beam along the transverse tilt axis Y, scanning a complete band requiring several of said transverse displacements, offsetting the laser beam along the line of greatest slope L at the end of each transverse displacement when reaching the periphery of the armature upper face 30. A scanning speed of few meters per second, five for instance, has shown good results.

Also, in a possible variant, still moving the beam in the same way, the scanning speed may be varied between starting and finishing ablation of a band. Slowing down said scanning speed enables the laser beam to focus longer on certain area of the band than on others and then to remove more material on said areas. The speed is then kept constant as long as ablating a line, or linear area, and the laser translating along the transverse axis Y and, when offsetting the beam in order to change line, the scanning speed may slightly reduce to enable the beam to remain longer on an area and then, remove more material.

The following table based on the example shown on FIGS. 3 and 4 where the upper face 30 is divided in nine bands B1-B9 illustrates this general ablating step.

| Band | Number of pass | Total depth ablated |
|------|----------------|---------------------|
| B1   | 9              | 9D                  |
| B2   | 8              | 8D                  |
| B3   | 7              | 7D                  |
| B4   | 6              | 6D                  |
| B5   | 5              | 5D                  |
| B6   | 4              | 4D                  |
| B7   | 3              | 3D                  |
| B8   | 2              | 2D                  |
| B9   | 1              | 1D                  |

This process method 100 enables to achieve the required parallelism between the surfaces and also to adjust the final air gap.

As it is represented in the axial section of FIG. 4, the newly ablated armature upper face is stepped. The steps come from the fact that the laser just removes a nominal depth D amount of material from the surface that it is focused on, therefore when face with a tilted surface, the laser does not react like a milling cutter which will mill the surface until it is in line with the machine axis, it simply removes the same amount off the whole surface and therefore does not improve the tilt angle. The act of ablating the surface in progressively deeper and deeper steps across the surface to correct the global face tilt, and make the surface "horizontal". Unfortunately this results in steps.

LIST OF REFERENCES

X main axis
Y tilt axis
L line of greatest slope
H tilt height
D pass depth
B band
12 control valve
14 valve body
16 valve spool-armature-and-stem assembly
18 valve body top face
20 valve body lower face
22 recess-armature chamber
24 hydraulic bore
26 bottom of the recess
28 armature
30 armature upper face
32 new ablated armature upper face
34 stem
100 method
110 measuring step
112 determining step
114 calculating step
116 dividing step
120 ablating step

The invention claimed is:

1. A method for achieving final air gap and parallelism of a control valve of a fuel injector, the control valve having a body extending about a main axis from a transverse top face to an opposed lower face and being provided with an axial hydraulic bore opening in a recess, the recess defining a chamber opening in the transverse top face, the control valve also having a spool comprising a disc magnetic armature having an axial central drilling opening at one end in a planar transverse upper face and at another end in an opposed lower face, and a stem fixed in the axial central drilling, the spool being arranged in the body in a rest position wherein, the stem is axially guided in the axial hydraulic bore, and the disc magnetic armature lies in the chamber, the planar transverse upper face being slightly recessed from the transverse top face, the method comprising:
   a) measuring an actual position from the planar transverse upper face to the transverse top face, and determining an actual parallelism error between the planar transverse upper face and the transverse top face; and
   b) ablating the disc magnetic armature to generate an ablated upper face parallel to the transverse top face, a distance from the ablated upper face to the transverse top face being a final air gap;
   wherein the measuring comprises:
   a1) determining a tilt axis and a line of greatest slope of the planar transverse upper face, the tilt axis and the line of greatest slope being perpendicular to each other, the tilt axis being a transverse axis about which the planar transverse upper face is angled;
   a2) calculating a tilt height between ends of the line of greatest slope, the tilt height being a distance measured along the main axis from a highest point of the line of greatest slope to a lowest point of the line of greatest slope, the highest point being closer to the transverse top face and the lowest point being further recessed in the chamber; and
   a3) dividing the tilt height in an individual ablating pass depth.

2. A method as claimed in claim 1, wherein the ablating comprises:
   b1) ablating the disc magnetic armature via successive passes of the individual depth, and generating the ablated upper face in successively ablating a plurality of parallel bands extending along the tilt axis.

3. A method as claimed in claim 2 wherein in the dividing in a3) the tilt height is of constant depth.

4. A method as claimed in claim 3, wherein the constant depth is approximately 1 μm.

5. A method as claimed in claim 2 wherein during the ablating in b) one of the plurality of parallel bands which comprises the highest point of the line of greatest slope, is ablated several times and another one of the plurality of bands which comprises to the lowest point of the line of greatest slope is ablated only one time.

6. A method as claimed in claim 5 wherein the one of the plurality of parallel bands which comprises the highest point of the line of greatest slope is ablated as many time as the tilt height has been divided in a3).

7. A method as claimed in claim 1, wherein the ablating step is performed using a picosecond or a femtosecond pulsed laser.

8. A control valve of a fuel injector, the control valve comprising:

a body extending about a main axis from a transverse top face to an opposed lower face and being provided with an axial hydraulic bore opening in a recess, the recess defining a chamber opening in the transverse top face; and a spool comprising a disc magnetic armature having an axial central drilling opening at one end in a planar transverse upper face and at another end in an opposed lower face, and a stem fixed in the axial central drilling, the spool being arranged in the body in a rest position wherein, the stem is axially guided in the axial hydraulic bore, and the disc magnetic armature lies in the chamber, the planar transverse upper face being slightly recessed from the transverse top face;

wherein the planar transverse upper face is ablated per the following:

a) measuring an actual position from the planar transverse upper face to the transverse top face, and determining an actual parallelism error between the planar transverse upper face and the transverse top face; and b) ablating the disc magnetic armature to generate an ablated upper face parallel to the transverse top face, a distance from the ablated upper face to the transverse top face being a final air gap;

wherein the final air gap is approximately 2 μm and the parallelism of the armature upper face and the body top face is approximately 10 μm.

9. A control valve of a fuel injector, the control valve comprising:

a body extending about a main axis from a transverse top face to an opposed lower face and being provided with an axial hydraulic bore opening in a recess, the recess defining a chamber opening in the transverse top face; and a spool comprising a disc magnetic armature having an axial central drilling opening at one end in a planar transverse upper face and at another end in an opposed lower face, and a stem fixed in the axial central drilling, the spool being arranged in the body in a rest position wherein, the stem is axially guided in the axial hydraulic bore, and the disc magnetic armature lies in the chamber, the planar transverse upper face being slightly recessed from the transverse top face;

wherein the planar transverse upper face is ablated per the following:

a) measuring an actual position from the planar transverse upper face to the transverse top face, and determining an actual parallelism error between the planar transverse upper face and the transverse top face; and b) ablating the disc magnetic armature to generate an ablated upper face parallel to the transverse top face, a distance from the ablated upper face to the transverse top face being a final air gap wherein the measuring comprises:

a1) determining a tilt axis and a line of greatest slope of the planar transverse upper face, the tilt axis and the line of greatest slope being perpendicular to each other, the tilt axis being a transverse axis about which the planar transverse upper face is angled;

a2) calculating a tilt height between ends of the line of greatest slope, the tilt height being a distance measured along the main axis from a highest point of the line of greatest slope to a lowest point of the line of greatest slope, the highest point being closer to the transverse top face and the lowest point being further recessed in the chamber; and a3) dividing the tilt height in an individual ablating pass depth.

* * * * *